United States Patent [19]

Rogers et al.

[11] Patent Number: 5,779,117
[45] Date of Patent: Jul. 14, 1998

[54] TOOL BOX ADAPTER

[76] Inventors: Gene R. Rogers; Joe R. Puckett. both of Rte. 1 Box 194AA. Davis, Okla. 73030

[21] Appl. No.: 726,001

[22] Filed: Oct. 4, 1996

[51] Int. Cl.[6] .................................................. B60R 9/00
[52] U.S. Cl. .......................... 224/403; 224/404; 224/544
[58] Field of Search ........................... 224/404, 405, 224/403, 544, 541; 296/3, 37.6, 43

[56]  References Cited

U.S. PATENT DOCUMENTS

| | | | |
|---|---|---|---|
| 4,444,427 | 4/1984 | Martin | 224/544 |
| 4,531,774 | 7/1985 | Whately | 224/404 |
| 4,812,093 | 3/1989 | Millar, Jr. | 296/43 |
| 5,052,737 | 10/1991 | Farmer, Jr. | 224/404 |
| 5,121,959 | 6/1992 | King | 224/404 |
| 5,255,832 | 10/1993 | Christensen | 224/404 |
| 5,257,728 | 11/1993 | Gibson | 224/405 |
| 5,494,327 | 2/1996 | Derecktor | 224/544 |

*Primary Examiner*—Linda J. Sholl

[57]  ABSTRACT

A new Tool Box Adapter for mounting a tool box to a pickup truck cargo box without the need for drilling holes into the cargo box walls. The inventive device includes an adapter plate, threaded attachment studs for attaching the adapter plate to a tool box, and a side brace for mounting the adapter plate to the cargo box of a pickup truck.

1 Claim, 3 Drawing Sheets

TOOL BOX ADAPTER

BACKGROUND OF THE INVENTION

1. Field of the Invention

The present invention relates to attachment structures for mounting tool boxes to truck cargo boxes and more particularly pertains to a new Tool Box Adapter for mounting a tool box to a pickup truck cargo box without the need for drilling holes into the cargo box walls.

2. Description of the Prior Art

The use of attachment structures for mounting tool boxes to truck cargo boxes is known in the prior art. More specifically, attachment structures for mounting tool boxes to truck cargo boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art attachment structures for mounting tool boxes to truck cargo boxes include U.S. Pat. No. 5,052,737; U.S. Pat. No. 4,531,774; and U.S. Pat. No. 4,085,961.

While these devices fulfill their respective, particular objectives and requirements, the aforementioned patents do not disclose a new Tool Box Adapter. The inventive device includes an adapter plate, means for attaching the adapter plate to a tool box and means for mounting the adapter plate to a pickup truck cargo box.

In these respects, the Tool Box Adapter according to the present invention substantially departs from the conventional concepts and designs of the prior art, and in so doing provides an apparatus primarily developed for the purpose of mounting a tool box to a pickup truck cargo box without the need for drilling holes into the cargo box walls.

SUMMARY OF THE INVENTION

In view of the foregoing disadvantages inherent in the known types of attachment structures for mounting tool boxes to truck cargo boxes now present in the prior art, the present invention provides a new Tool Box Adapter construction wherein the same can be utilized for mounting a tool box to a pickup truck cargo box without the need for drilling holes into the cargo box walls.

The general purpose of the present invention, which will be described subsequently in greater detail, is to provide a new Tool Box Adapter apparatus and method which has many of the advantages of the attachment structures for mounting tool boxes to truck cargo boxes mentioned heretofore and many novel features that result in a new Tool Box Adapter which is not anticipated, rendered obvious, suggested, or even implied by any of the prior art attachment structures for mounting tool boxes to truck cargo boxes, either alone or in any combination thereof.

To attain this, the present invention generally comprises an adapter plate, means for attaching the adapter plate to a tool box and means for mounting the adapter plate to a pickup truck cargo box.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Tool Box Adapter apparatus and method which has many of the advantages of the attachment structures for mounting tool boxes to truck cargo boxes mentioned heretofore and many novel features that result in a new Tool Box Adapter which is not anticipated, rendered obvious, suggested, or even implied by any of the prior art attachment structures for mounting tool boxes to truck cargo boxes, either alone or in any combination thereof.

It is another object of the present invention to provide a new Tool Box Adapter which may be easily and efficiently manufactured and marketed.

It is a further object of the present invention to provide a new Tool Box Adapter which is of a durable and reliable construction.

An even further object of the present invention is to provide a new Tool Box Adapter which is susceptible of a low cost of manufacture with regard to both materials and labor, and which accordingly is then susceptible of low prices of sale to the consuming public, thereby making such Tool Box Adapter economically available to the buying public.

Still yet another object of the present invention is to provide a new Tool Box Adapter which provides in the apparatuses and methods of the prior art some of the advantages thereof, while simultaneously overcoming some of the disadvantages normally associated therewith.

Still another object of the present invention is to provide a new Tool Box Adapter for mounting a tool box to a pickup truck cargo box without the need for drilling holes into the cargo box walls.

Yet another object of the present invention is to provide a new Tool Box Adapter which includes an adapter plate, means for attaching the adapter plate to a tool box and means for mounting the adapter plate to a pickup truck cargo box.

Still yet another object of the present invention is to provide a new Tool Box Adapter that is easy to install.

Even still another object of the present invention is to provide a new Tool Box Adapter that safely and securely attaches a tool box to a pickup truck cargo box.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
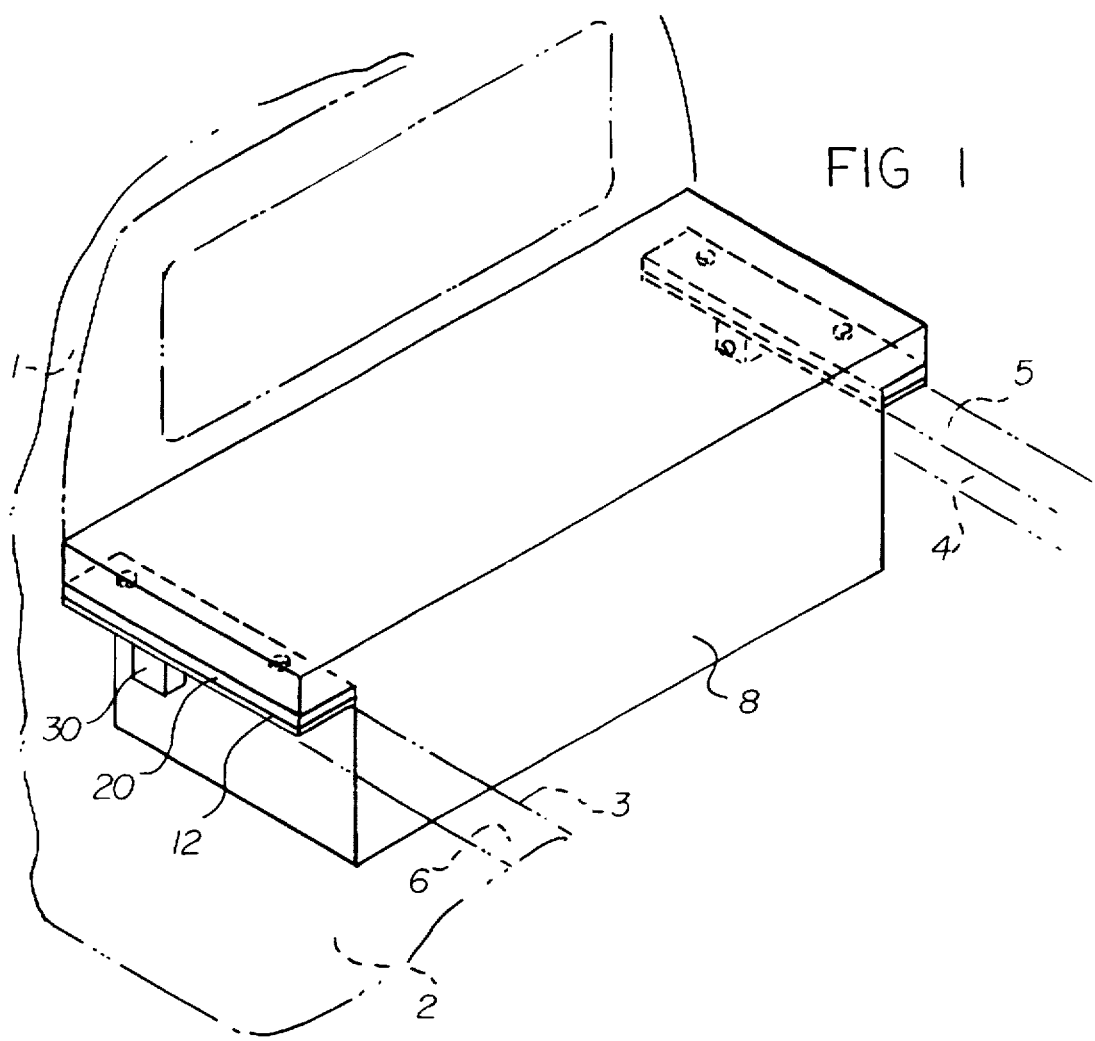
FIG. 1 is a schematic perspective view of a the new Tool Box Adapter of the present invention mounted on a tool box and particularly illustrating the mounted relationship of the Tool Box Adapter the cargo box of a pickup truck (shown in broken lines).

With reference now to the drawings, and in particular to FIGS. 1 through 6 thereof, a new Tool Box Adapter embodying the principles and concepts of the present invention and generally designated by the reference numeral 10 will be described.

More specifically, it will be noted that the Tool Box Adapter 10 comprises an adapter plate, a means for attaching the adapter plate to a tool box and a means for mounting the adapter plate to the cargo box of the pickup truck.

In FIG. 1, the Tool Box Adapter 10 is shown in mounted relationship to a tool box 8 and the cargo box 2 of a pickup truck 1. A cargo box 2 of a pickup truck 1 suitable for use with the tool box adapter 10 of the invention includes parallel, laterally spaced side walls 3, 4 with side wall ledges 5, 6 at their respective upper regions. A suitable tool box 8 bridges across the interior of the cargo box 2 and rests upon the side wall ledges 5, 6 for vertical support. The typical tool box depends below the level of the ledges 5, 6 of the side walls 3, 4 into the interior of the cargo box 2.

The tool box adapter 10 of the invention includes an adapter plate 20 having an upper surface 21 and a lower surface 22. A preferred material for the adapter plate 20 is aluminum, but other metals and sufficiently stiff and strong materials may also be used.

On the upper surface of the adapter plate 20 is located attaching means for attaching the adapter plate 20 to a tool box 8. The preferred attaching means comprises at least one attachment stud 23 protruding from the upper surface 21 of the adapter plate 20. Ideally, the attachment stud 23 is formed by a bolt having a head mounted flush with the lower surface 22 of the plate 20 and extending upwardly through the upper surface 21 of the adapter plate 20.

The upwardly extending attachment stud 23 is adapted to be inserted through an attachment hole (not shown) in the bottom wall of the tool box. An attachment nut 25 is threaded onto the attachment stud 23 on the interior side of the tool box's bottom wall and is threaded tight against the bottom wall to press the bottom wall against the upper surface 21 of the adapter plate 20. When the access door of the tool box is closed (and, e.g., locked), the attachment nuts 25 are enclosed in the interior of the tool box and are inaccessible to persons unable to open (e.g., unlock) the access door.

Figure 5:
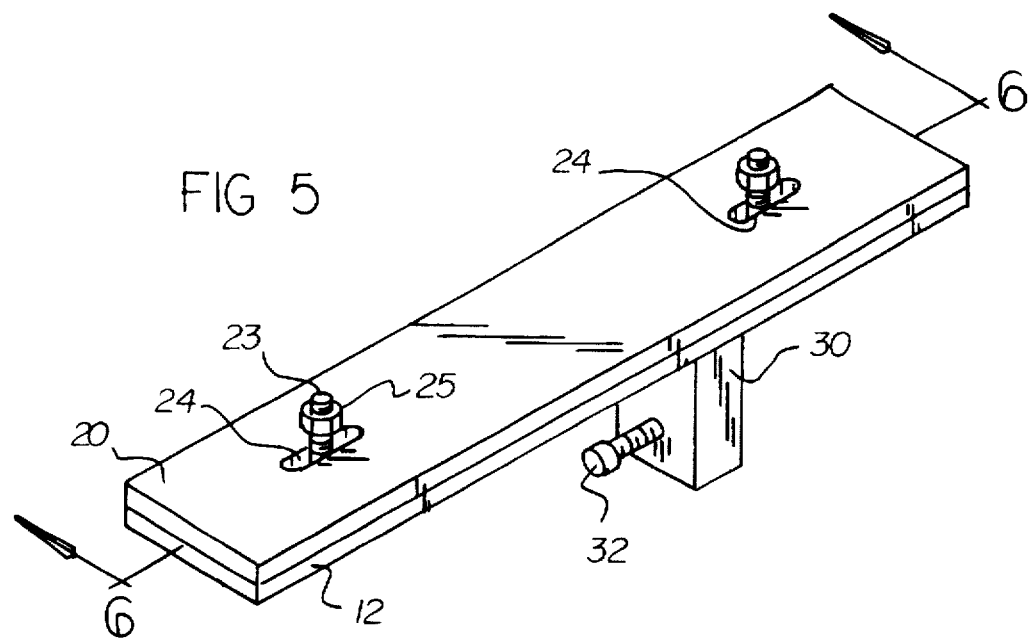
FIG. 5 is a schematic perspective view of an optional embodiment of the Tool Box Adapter of the invention.
Figure 6:
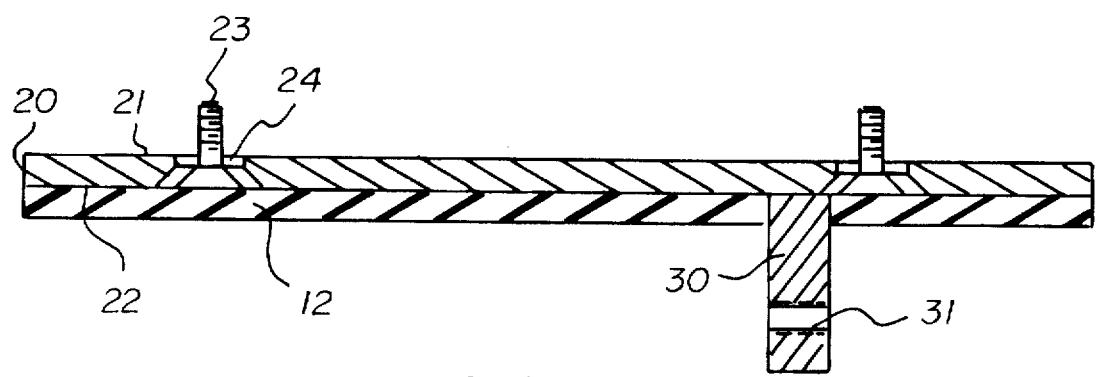
FIG. 6 is a schematic cross sectional view of the optional Tool Box Adapter embodiment taken along line 6—6 of FIG. 5.

The aperture in the adapter plate 20 through which the attachment stud 23 passes through may be circular so as to closely approximate the size of the shaft of the stud 23, although a slot 24 (as shown in FIGS. 5 and 6) is preferred to permit sliding adjustability of the mounting location of the attachment stud 23 to permit the adapter plate 20 to be used with tool boxes with various attachment hole locations.

The tool box adapter 10 of the invention also includes mounting means for mounting the adapter plate 20 to the side wall 2 of the cargo box 2 of a pickup truck 1. The preferred means for accomplishing the mounting of the adapter plate 20 to the cargo box 2 comprises a side wall brace 30 that protrudes from the lower surface 22 of the adapter plate 20. The side wall brace 30 is sized to fit into the vertical mounting channel (not shown) commonly found in the side wall ledges 5, 6 of the pickup truck cargo box 2. When the adapter plate 20 is rested on the ledge 5 of the side wall 3, the side wall brace 30 is inserted into the mounting channel and resists lateral or sideways movement of the adapter plate 20 relative to the cargo box 2.

Figure 2:
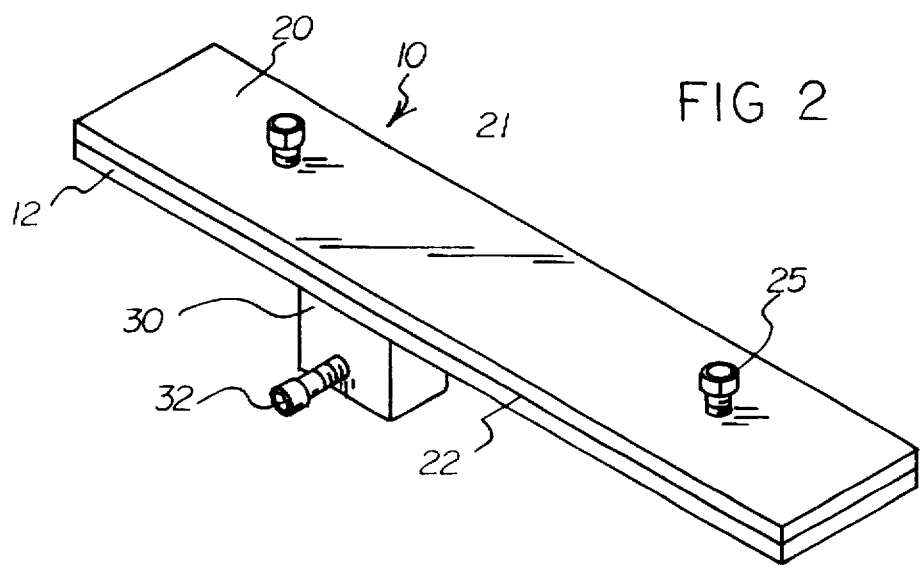
FIG. 2 is a schematic perspective view of the Tool Box Adapter of the invention.
Figure 3:
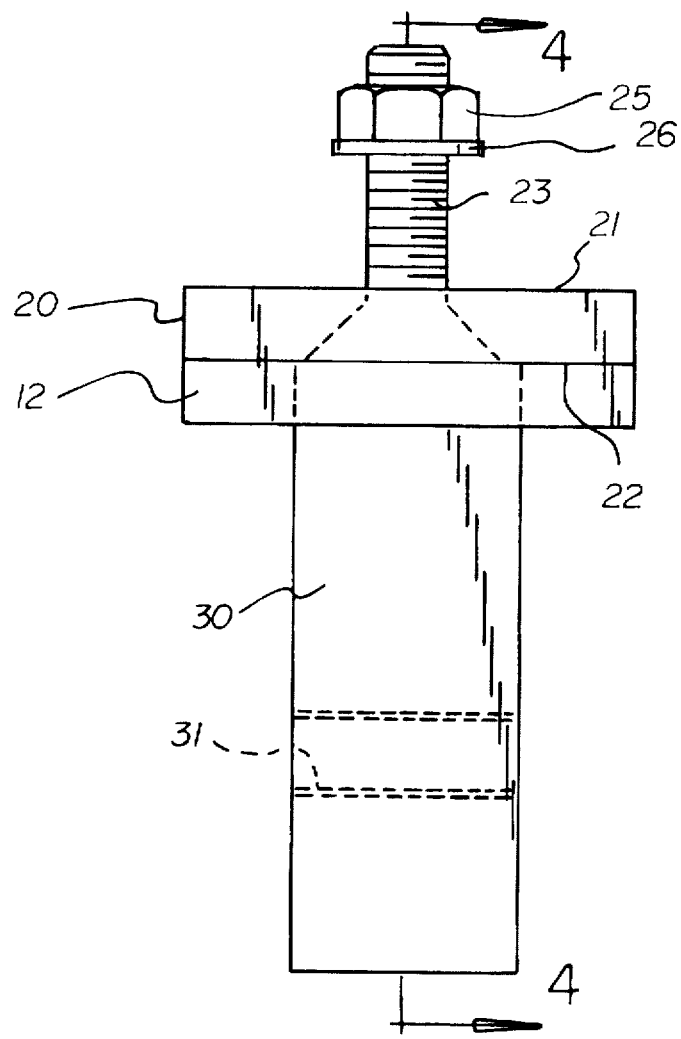
FIG. 3 is a schematic end view of the Tool Box Adapter.
Figure 4:
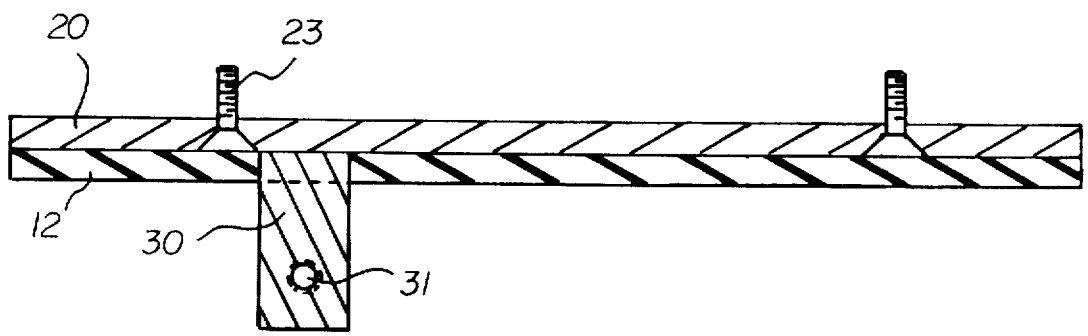
FIG. 4 is a schematic cross sectional view of the Tool Box Adapter taken along line 4—4 of FIG. 3.

To secure the adapter plate 20 to the mounting channel against vertical movement relative to the cargo box 2, the tool box adapter 10 is provided with a mounting screw 32 for passing through a mounting channel hole that extends between the interior of the mounting channel and the interior of the cargo box 2. The mounting screw 32 is preferably inserted through the mounting channel hole and into a threaded securing hole 31 in the side wall brace 30 of the tool box adapter 10. The position of the securing hole 31 may be varied to match the channel mounting hole position in different makes of pickup trucks, and optionally the side wall brace 30 may be provided with more than one securing hole 31 so that it may fit several makes of pickup trucks. Illustratively, a securing hole 31 orientation substantially transverse to the longitudinal length of the adapter plate 20 is shown in FIGS. 2 and 3, and a securing hole orientation substantially parallel to the longitudinal length of the adapter plate 20 is shown in FIGS. 5 and 6.

Optionally, a rubber pad 12 is provided between the lower surface 22 of the adapter plate 20 and the side wall ledge to protect the surface finish (e.g., paint) on the side wall ledge 5 and absorb vibration that might be transmitted between the cargo box 2 and the tool box 8.

Use of the tool box adapter 10 of the invention provides several advantages to the user, including the elimination of the need to drill tool box mounting holes directly in the side wall ledge 5, the elimination of lateral (e.g., side to side) and longitudinal (e.g., front to back) movement of the tool box 8 in the interior of the cargo box 2, and security from theft of the tool box from the cargo box.

The tool box adapter 10 is preferably installed by inserting the side wall brace 30 of the adapter 10 into the side wall mounting channel until the lower surface 22 (or the rubber pad 12) rests upon the ledge 5 of the of the side wall 3. The mounting screw 32 is then inserted through the mounting channel hole and then threaded into the securing hole 31 in the side wall brace 30 to thereby securely mount the adapter plate 20 to the cargo box 2 of the truck. The tool box 8 is then lowered onto the adapter plate 20 such that the attachment studs are inserted through the holes in the bottom wall of the tool box 8. (Adjustable shifting of the attachment studs 23 in the adjustment slot 24 may be necessary to achieve alignment of the studs 23 with the attachment holes in the bottom wall of the tool box 8.) The attachment washers 26 and attachment nuts 25 are then tightened into place on the attachment studs 23 to securely attach the tool box to the adapter plate 20. Significantly, the installation of the tool box on the adapter plate 20 blocks any ability to remove the tool box from the cargo box without first having access to the interior of the tool box.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

What is claimed as being new and desired to be protected by letters patent of the United States is as follows:

1. A tool box attachment adapter for securing a tool box to a cargo box of a pickup truck, the tool box structured to have attachment apertures, the pickup truck having parallel laterally spaced side walls, the pickup truck further having side wall ledges on a top surface of the side walls, each of the side wall ledges having a vertical mounting channel, each mounting channel having a mounting channel hole leading from the mounting channel through to an interior of the cargo box, the adapter comprising:

a plate member having an upper surface and a lower surface;

a number of threaded attachment studs, each stud protruding through a respective slot in the plate member such that each stud extends upwardly from the upper surface of the plate member, the studs further having a head portion positioned flush with the lower surface of the plate member;

each stud having a stud nut removably engageable to the threaded stud;

each stud slidable within the respective plate member slot such that the studs can align with the tool box apertures;

a side wall bracing member disposed perpendicularly from the lower surface of the plate member, the side wall bracing member adapted for insertion into the vertical mounting channel in the side wall of the pick up, the bracing member further structured to have a mounting screw disposed from the bracing member, the mounting screw positionable through the mounting channel hole;

a mounting screw nut engageable to the mounting screw; and a rubber pad covering the lower surface of the plate member such that the plate member does not directly contact the pickup truck.

* * * * *